Nov. 18, 1947.         C. G. CHRISTIAN                 2,430,912
            GRASS TAMPING ATTACHMENT FOR LAWN MOWERS
                  Filed Jan. 20, 1945        2 Sheets-Sheet 1
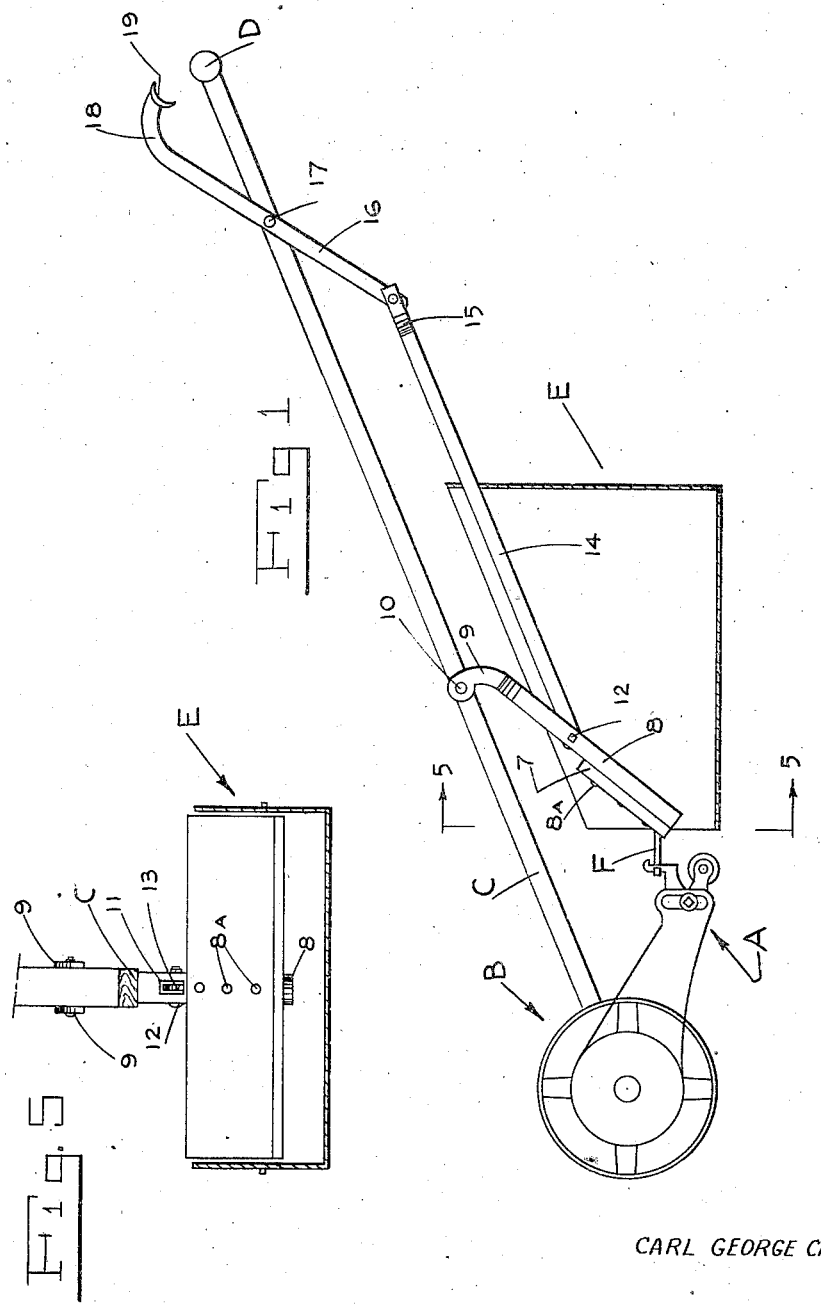
Inventor
CARL GEORGE CHRISTIAN
By Clarence A. O'Brien
and Harvey B. Jacobson
Attorneys Nov. 18, 1947.   C. G. CHRISTIAN   2,430,912
GRASS TAMPING ATTACHMENT FOR LAWN MOWERS
Filed Jan. 20, 1945   2 Sheets-Sheet 2
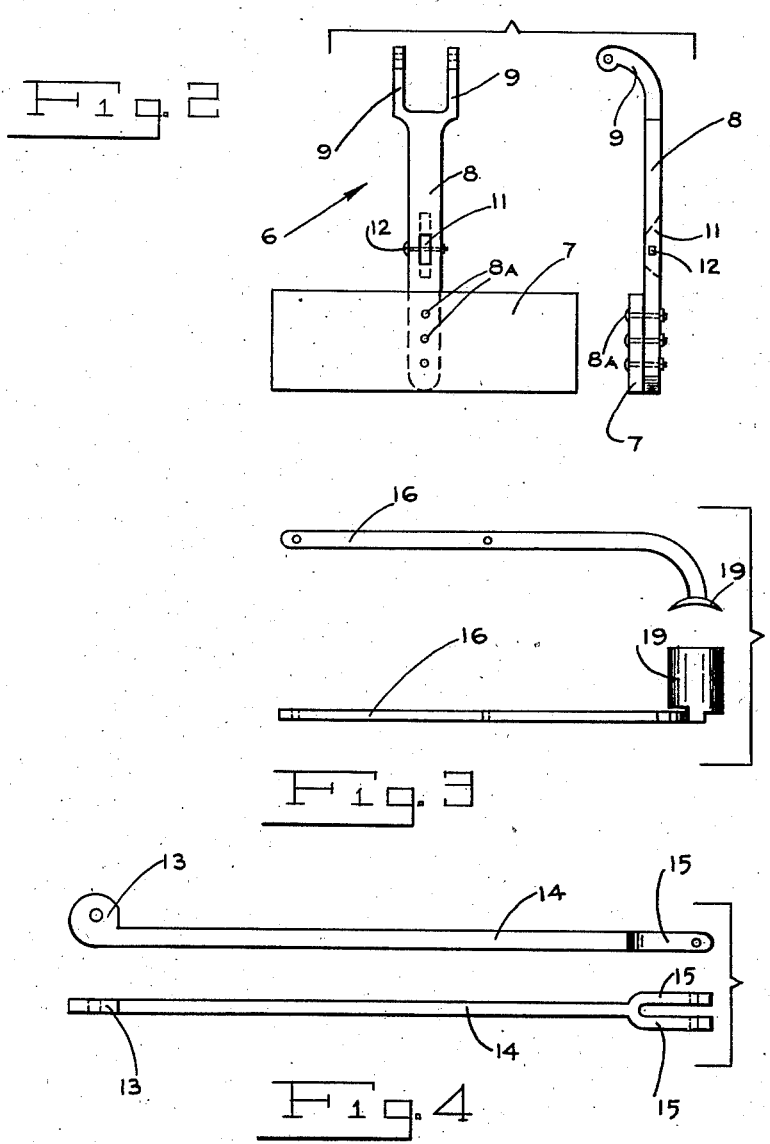
Inventor
CARL GEORGE CHRISTIAN Patented Nov. 18, 1947

2,430,912

UNITED STATES PATENT OFFICE 2,430,912

GRASS TAMPING ATTACHMENT FOR LAWN MOWERS

Carl George Christian, La Salle, Colo.

Application January 20, 1945, Serial No. 573,715

2 Claims. (Cl. 56—199)

This invention relates to a grass tamping attachment for conventional lawn mowers, the same being so constructed and mounted on the usual handle to lend itself adaptable for use in association with a so-called grass catcher.

Needless to say, I am aware that the prior art to which the invention relates embodies patented blades, plates and the like, which can be brought into play at the will of the operator, in lifting and packing the grass cuttings in basket-type catchers. It follows, therefore, that I aim to provide a distinct as well as novel contribution to the art, this in the form of what is believed to be a more satisfactorily balanced and designed scooping and tamping device.

One phase of the invention has to do with a simple and expedient tamping unit characterized by a paddle-like follower, this carried by the lower end of a hinge attached swingable arm, the latter, through the medium of suitable operating means, being normally maintained in a position well above the grass catcher so as not to interfere with the normal functioning thereof, but being in readiness to be swept down to rearward raking and tamping position.

An equally important object has to do with a lever pivoted adjacent the hand-grips on the handle of the mower, this being connected by a link to the aforementioned arm, and said lever having a conveniently arranged adapter coacting with the regular hand-grips so as to hold the parts in a normally out-of-the-way position but to render same readily movable into positions for use.

Other features and advantages will become more readily apparent from the following description and the accompanying illustrative drawings.

In the drawings, wherein like numerals are employed to designate like parts throughout the views:

Figure 1 is a side elevational view of a conventional lawn mower showing a grass catcher, this in section, and also showing the improved grass tamping attachment as constructed in accordance with my ideas.

Figure 2 is a group view showing face and edge elevations of the tamping device per se.

Figure 3 is a group elevational view showing side and top elevations of the aforementioned lever.

Figure 4 is a similar group view showing the push-pull link.

Figure 5 is a vertical section taken approximately on the plane of the line 5—5 of Figure 1, looking in the direction of the arrows.

Referring now to the drawings by distinguishing reference characters it will be seen that the carriage of the lawn mower is denoted at A and the mower proper at B. The handle is indicated at C and the hand-grips at the upper end of the handle by the reference letter D.

The basket or grass catcher is indicated at E and this may be, obviously, of any suitable construction and provided with hooks or the like F for attachment to the carriage of the lawn mower. All of these are old parts, as is obvious.

As before indicated, the tamping unit or device per se, is of a downwardly swinging and rearwardly sweeping type and is normally maintained in an elevated overhead position above and out of the path of operation of the grass catcher E. In Figure 1 it is shown in a partly "down" position in readiness to move rearwardly for tamping and packing the grass cuttings in the catcher. This unit or device is generally denoted by the reference numeral 6 and comprises a substantially rectangular follower blade 7 proportioned to properly sweep into the intake end of the grass catcher. This part may be of wood or other suitable light weight material. A hanger arm 8 is attached at its lower end as indicated at 8a to the central portion of the follower 7. This arm is provided at its upper end with a yoke whose limbs 9 straddle and are pivotally connected as at 10 to the intermediate portion of the handle C. The limbs are properly curved and off-set to provide the desired angular movement. The intermediate portion of the arm is formed with a dovetail-shaped slot 11 having a suitable fastening 12 which secures the eye 13 on the push-pull link 14 pivotally in place. The rear end of the push-pull link is provided with a clevis 15 which is pivotally connected to the adjacent end-portion of the lever 16. This lever is pivotally mounted intermediate its ends, as at 17, on the upper end-portion of the handle C. Further, the end of the lever adjacent the hand-grips D is curved as at 18 where it terminates in a lateral semi-circular adapter 19 which forms a sort of an auxiliary hand-grip and fits down over the hand-grips C. This makes it possible to keep the part 19 against the co-acting hand-grip and to also maintain the entire linkage structure in a position to support the follower 7 completely out of the range of the intake end of the grass catcher. Thus, normally the device is in an elevated out-of-the-way position. When it is desired to bring same into play the adapter 19 is snapped away from the hand-grip with which it is associated and the lever is swung to the position seen in Figure 1 whereupon the push-pull link serves to keep the follower board or blade 7 down and into the intake end of the basket. A further movement of the lever serves to bring the follower to a position to rake and tamp the grass cuttings in the rear collecting portion of the grass catcher. It is possible to raise and lower the elevation of the handle C to render the path of clearance of the follower 7 in proper relation to the bottom of the catcher.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. In a structural assemblage of the class described, in combination, a lawn mower construction including a mower provided with a handle, said handle being provided at its inner end with hand-grips, a conventional drag-type grass catcher attached to and trailing said mower, a substantially rectangular grass-follower for tamping the cuttings in said grass catcher, said follower being swingable in and out and up and down in relation to said catcher, an arm attached to the central portion of said follower, said arm being provided with a yoke, the limbs of said yoke being hingedly connected to the intermediate portion of said handle, a lever pivotally mounted intermediate its ends on the inner end portion of said handle, and a push-pull link pivotally connected at opposite ends to said arm and lever, respectively.

2. In a structural assemblage of the class described, in combination, a lawn mower construction including mower means provided with a handle, said handle being provided at its inner end with hand-grips, a conventional drag-type grass catcher attached to and trailing said mower means, a substantially rectangular grass-follower for tamping the cuttings in said grass catcher, said follower being swingable in and out and up and down in relation to said catcher, an arm attached to the central portion of said follower, said arm being provided with a yoke, the limbs of said yoke being hingedly connected to the intermediate portion of said handle, a lever pivotally mounted intermediate its ends on the inner end portion of said handle, and a rigid push-pull link pivotally connected at opposite ends to said arm and lever, respectively, the upper end portion of said lever being laterally curved and said end terminating in a right angularly disposed semi-circular adaptor, said adaptor constituting a controlling lever and actuating grip and being positioned and arranged to co-act with one of the aforementioned hand-grips in order to expedite the handling and use of said lever with the hand-grips and handle.

CARL GEORGE CHRISTIAN.

REFERENCES CITED

The following references are of record in the file of this patent:

UNITED STATES PATENTS

| Number | Name | Date |
|---|---|---|
| 617,006 | Young | Jan. 3, 1899 |
| 1,881,618 | Jacobsen | Oct. 11, 1932 |
| 2,067,916 | Haffner et al. | Jan. 19, 1937 |